United States Patent [19]

Izukawa

[11] Patent Number: 5,614,969
[45] Date of Patent: Mar. 25, 1997

[54] CAMERA

[75] Inventor: Kazuhiro Izukawa, Saitama-ken, Japan

[73] Assignee: Canon Kabushiki Kaisha, Tokyo, Japan

[21] Appl. No.: 358,266

[22] Filed: Dec. 19, 1994

[30] Foreign Application Priority Data

Dec. 27, 1993 [JP] Japan .................................. 5-347174

[51] Int. Cl.$^6$ ................................................. G03B 17/24
[52] U.S. Cl. .............................................................. 396/319
[58] Field of Search .................................. 354/105, 106, 354/21

[56] References Cited

U.S. PATENT DOCUMENTS

| | | | |
|---|---|---|---|
| 5,220,367 | 6/1993 | Matsuyama | 354/105 |
| 5,281,987 | 1/1994 | Nagata | 354/105 |
| 5,302,986 | 4/1994 | Kazami | 354/106 |

*Primary Examiner*—David M. Gray
*Attorney, Agent, or Firm*—Robin, Blecker, Daley & Driscoll

[57] ABSTRACT

A camera adapted for using a film cartridge of the kind having a magnetic recording part provided for each frame portion of a film contained therein is arranged to write information into the recording part every time a shot is taken for each frame. In case where the film contained in the film cartridge is used only halfway, the camera makes a search for the beginning part of unexposed frame portions by detecting the amount of information recorded in the magnetic recording part of each frame portion. For this purpose, a reference value to be used in making a discrimination between an exposed state and an unexposed state is set on the basis of the amount of information obtained from each frame and also according to the amounts of noises, etc. The arrangement disclosed enables the camera to accurately carry out the search for the unexposed frame portions of the film.

11 Claims, 8 Drawing Sheets

NOT EXPOSED (FRESH)

FULLY EXPOSED

EXPOSED PARTIALLY

DEVELOPED PROCESSED

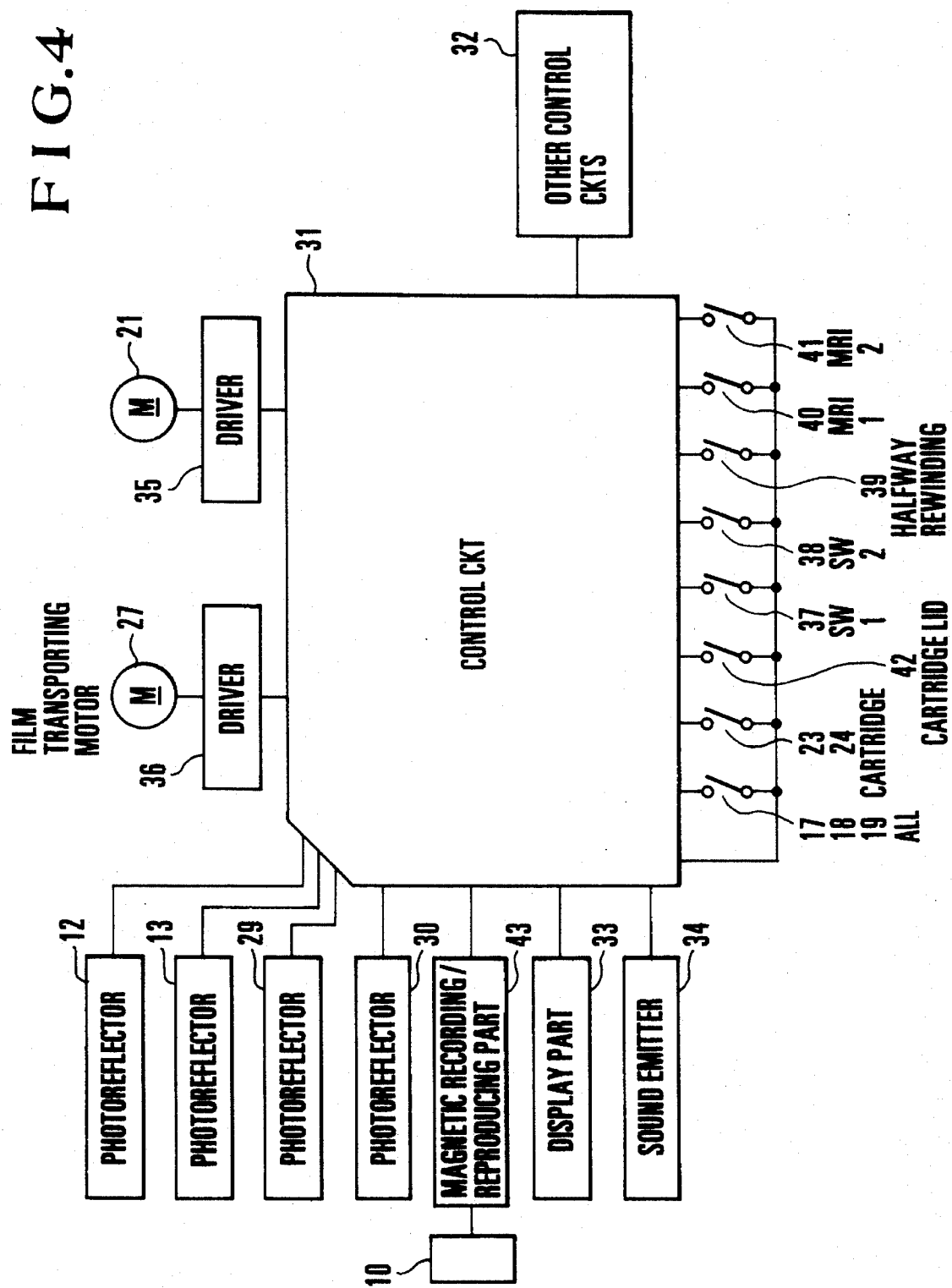

CAMERA

BACKGROUND OF THE INVENTION

1. Field of the Invention

This invention relates to a camera having means for making a discrimination between an exposed state and an unexposed state of a film in use.

2. Description of the Related Art

The products of the prior art related to this invention include a camera disclosed in U.S. Pat. No. 4,878,075. This camera is arranged to find whether a film has already been exposed or not according to presence or absence of a signal reproduced from a magnetic recording part provided on the film. Another camera which has been disclosed in U.S. Pat. No. 5,049,913 is arranged to judge whether a film has been exposed from the rotated position of a rotary disk which is provided with a black-and-white pattern and is disposed on a film cartridge. A further example of a camera of this kind disclosed in Japanese Laid-Open Patent Application No. HEI 4-343353 is provided with a movable light-blocking window for the same purpose. However the cameras cited by way of example here have presented the following shortcomings.

1) The disclosure made in U.S. Pat. No. 4,878,075, for example, includes no description relative to an amount of information to be used in deciding whether or not each frame on the film has been exposed. It thus shows no countermeasures against inadequate reproduction resulting from a decrease in the amount of information due to dust sticking to a magnetic head and a malfunction resulting from an increase in the amount of information due to an external noise.

2) U.S. Pat. Nos. 4,878,075 and 5,049,913 disclose no particular arrangement in respect to selection between one means for deciding an exposed state of the film from information provided on a film cartridge and another means for deciding it for each frame of the film from magnetic information provided on the film. The lack of disclosure in this respect tends to cause a part of the film to be discarded in an unexposed state in case where the film has been exposed or used only in part in actuality while indication on the film cartridge shows that the whole film has been exposed.

3) U.S. Pat. No. 5,049,913 and Japanese Laid-Open Patent Application No. HEI 4-343353 disclose nothing about making a discrimination between an exposed state and an unexposed state as in relation to an opening or closing action on a movable light-blocking window provided on the film cartridge. The lack of disclosure in that respect tends to cause the movable light-blocking window to be wastefully opened while the film in the cartridge has been decided or judged to have been exposed.

SUMMARY OF THE INVENTION

It is one aspect of the invention under the present application to provide a camera which is arranged to make a decision or a discrimination between an exposed state and an unexposed state of a film on the basis of the amount of a signal reproduced from a magnetic recording part by setting a reference value for the discrimination according to a noise level or a predetermined level of the signal (or information) reproduced from the recording part, so that the decision can be accurately made.

It is another aspect of the invention to provide a camera which controls opening and closing actions of a movable light-blocking window of a film cartridge according to the state of use of a film indicated in a pattern on the film cartridge is arranged to cause the light-blocking window to be closed when the pattern on the film cartridge indicates an exposed state of the film.

It is a further aspect of the invention to provide a camera which makes a discrimination between an exposed state and an unexposed state of a film on the basis of the amount of a signal (information) reproduced from a magnetic recording part is arranged to set deciding levels of the reproduced signal, including a first range of levels in which the film is to be judged as in an exposed state, a second range in which the film is to be judged as in an unexposed state and an intermediate range between the first and second ranges. The camera is arranged such that, in case where the level of a signal or information reproduced for a frame portion of the film is in the intermediate range, the record of information for the frame is again reproduced and, if the level of the reproduced signal is confirmed to be not within the second level range through the repeated reproduction, the frame is decided to be in an exposed state.

These and other aspects and features of the invention will become apparent from the following detailed description of embodiments thereof taken in connection with the accompanying drawings.

BRIEF DESCRIPTION OF THE DRAWINGS

FIG. 4 is a block diagram showing an electrical arrangement of the first embodiment of the invention.

DETAILED DESCRIPTION OF PREFERRED EMBODIMENT

Figure 1:
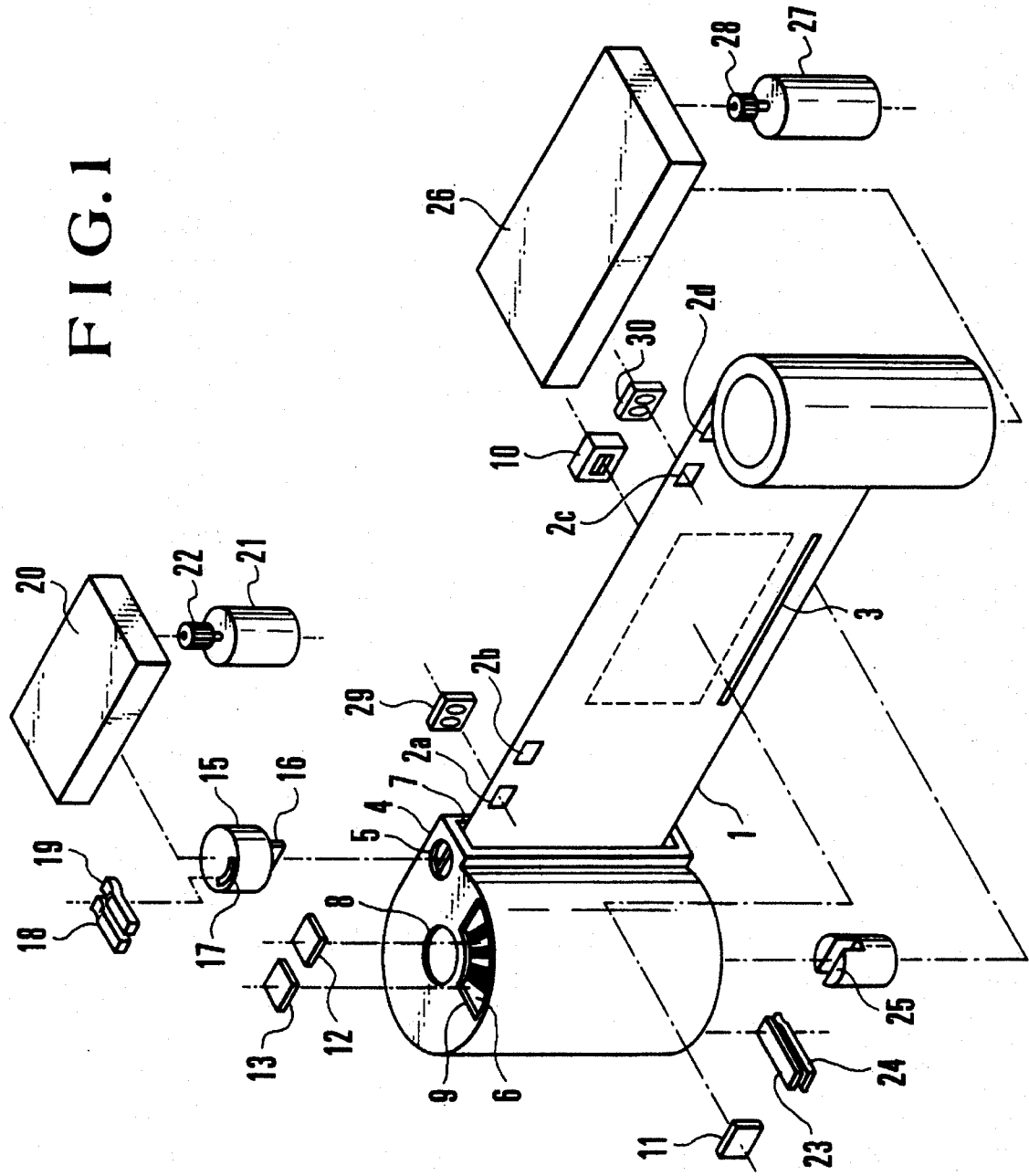
FIG. 1 is an exploded oblique view showing the arrangement of a first embodiment of the invention.
Figure 2:
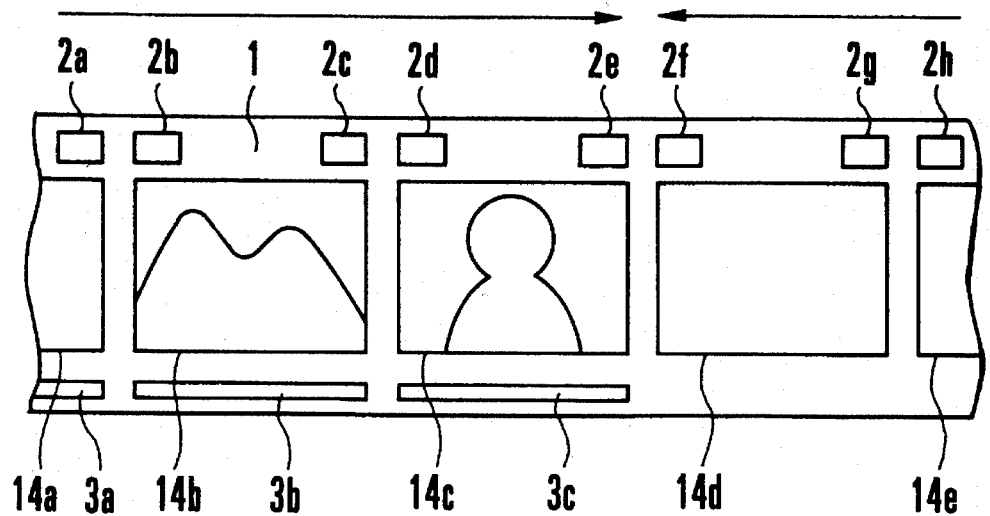
FIG. 2 is plan view showing an exposed state obtained on a film.
Figure 3A:
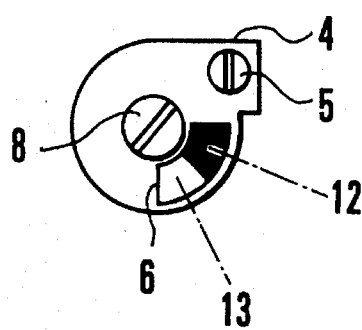
FIGS. 3a–3d show a film exposure indicator part of a film cartridge.
Figure 3B:
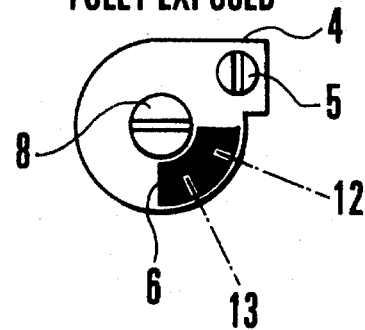
Figure 3C:
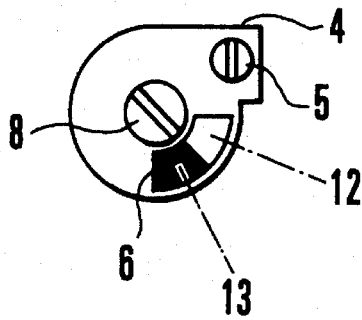
Figure 3D:
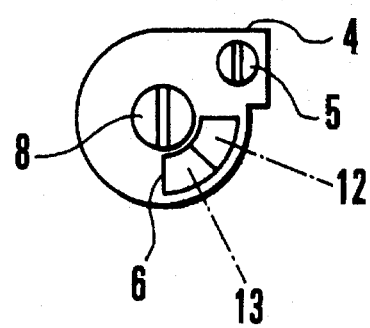

FIGS. 1 to 5 show a camera arranged as a first embodiment of the invention. FIG. 1 shows the structural arrangement of the first embodiment. The illustration includes a film 1, perforations 2 provided in the film 1 including perforated holes 2a, 2b, 2c, ..., a magnetic recording part 3 which is provided on the film 1, a film cartridge 4, and a movable light-blocking window operating part 5 provided for opening and closing a movable light-blocking window of the film cartridge 4. A film exposure indicator 6 is arranged to show in a black-and-white pattern whether or not the film contained in the film cartridge 4 has been exposed. The movable light-blocking window 7 is provided in the film cartridge and is arranged to be opened and closed by operating the movable light-blocking window operating part 5. A spool shaft 8 of the cartridge 4 is arranged to have the film 1 wound into the cartridge 4 by rotating the spool shaft 8 in the direction of rewinding the film. A window 9 is provided in the film cartridge 4 to show the film exposure indicator 6. The indicating state of this part 6 is detectable by detecting means. A magnetic head 10 is opposed to an aperture indicated by a broken line and arranged to record and reproduce information on and from the magnetic recording part of the film 1. A pad 11 is opposed to the magnetic head and arranged to have the film 1 sandwiched in between the magnetic head 10 and the pad 11 with a predetermined pinching force. The magnetic head 10 is arranged to be brought into contact with the magnetic recording part 3 of the film 1 by a force developed jointly by the pad 11 and the magnetic head 10. Photoreflectors 12 and 13 are arranged to detect the state of the film exposure indicator. In FIG. 2, exposing parts 14 on the surface of the film 1 includes, in this case, exposed parts 14a, 14b and 14c and unexposed parts 14d, 14e, etc.

Referring again to FIG. 1, a movable light-blocking window opening/closing member 15 is arranged to cause, through the movable-light-blocking-window operating part 5, the movable light-blocking window 7 to open and close by rotating. A connection part 16 is provided on the movable light-blocking-window opening/closing member 15 for connection with the movable-light-blocking-window operating part 5. An electrode member 17 is arranged on the movable light-blocking window opening/closing member 15 to render movable light-blocking window opening/closing detecting switches 18 and 19 conductive or nonconductive according to the rotation of the movable light-blocking window opening/closing member 15. In the case of the first embodiment, the movable light-blocking window 7 is opened when these switches 18 and 19 are conductive. A gear unit 20 is arranged to drive the movable light-blocking window opening/closing member 15 with the driving force of a motor 21 through a gear 22. Cartridge presence and absence detecting switches 23 and 24 are arranged to become conductive when a film cartridge 4 is inserted into a cartridge chamber provided in the camera body, which is not shown. A film rewinding connection member 25 is arranged to allow the film 1 to be rewound back into the film cartridge 4 by rotating. A gear unit 26 is arranged to transmit the driving force of a motor 27 through a gear 28 to the film rewinding connection member 25 and a film rewinding member which is not shown.

When the film 1 is to be pushed out from the film cartridge 4, the film 1 can be wound up by first rotating the rewinding connection member 25 in the direction of moving the film 1 out of the cartridge 4 and, at the same time, by rotating a film take-up member which is not shown in the direction of film winding. Next, when the push-out force of the film rewinding connection member 25 is overcome by the winding force of the film take-up member, the film rewinding connection member 25 comes to have no driving force as a planet gear included in the gear unit 26 comes out of mesh with the gear unit 26. By this, a film winding load on the motor 27 can be lessened. Further, in rewinding the film 1, the motor 27 reversely rotates to cause the film rewinding connection member 25 to rotate in the direction of moving the film 1 into the film cartridge 4, so that the film 1 can be rewound back to the inside of the film cartridge 4. A photoreflector 29 is arranged to serve as a perforation sensor 2. A photoreflector 30 is arranged to serve as a perforation sensor 1. When the film 1 moves, the perforations 2 pass the front side of the perforation sensor 2 (29). The moving speed of the film 1 is detected at the sensor 2. Then a signal of recording frequency corresponding to the film moving speed is applied to the magnetic head 10 for magnetic recording. When the perforations 2 come to pass the front side of the perforation sensor 1 (30), the rotating speed of the motor 27 is reduced to make stopping the motor 27 easier by time dividing the supply of a current to the motor 27. The instant the perforation again comes to pass the sensor 1, the film 1 is brought to a stop by applying the brake with two end electrodes of the motor 27 set at a ground level.

FIG. 3 shows the film cartridge as viewed from one side of it where the film exposure indicator 6 is disposed. In FIG. 3, reference numerals 12 and 13 denote the center positions of the photoreflectors 12 and 13. The spool shaft 8 does not rotate with the movable light-blocking window operating part 5 in its position shown in FIG. 3.

The film has not been exposed or fresh when the film exposure indicator 6 is in a state as shown at a part (a) in FIG. 3. All the frames of the film have been already exposed when the film exposure indicator 6 is in a state as shown at a part (b) in FIG. 3. The film is exposed in part when the film exposure indicator 6 is in a state as shown at a part (c) in FIG. 3. The film has already been developed when the film exposure indicator 6 is in a state as shown at a part (d) in FIG. 3.

FIG. 4 shows in a block diagram the circuit arrangement of the first embodiment. The illustration includes a control circuit 31 and other control circuits 32 which include an automatic focusing (AF) control circuit, an automatic exposure amount control (AE) circuit, a shutter control (SH) circuit, etc. A display part 33 is composed of a LCD, etc. A reference numeral 34 denotes a sound emitter. Numerals 35 and 36 denote motor driver circuits. Switches 1 and 2 (37 and 38) are arranged to turn on respectively in response to first and second strokes of operation on a release button, in the order of the switch 1 and the switch 2. A reference numeral 39 denotes a film halfway rewinding switch. Numerals 40 and 41 denote forcibly-halfway-taken-out film using switches 1 and 2 (hereinafter referred to as MRI switches 1 and 2). A numeral 42 denotes a cartridge-lid-closing detecting switch. A numeral 43 denotes a magnetic recording/reproducing part.

Figure 5:
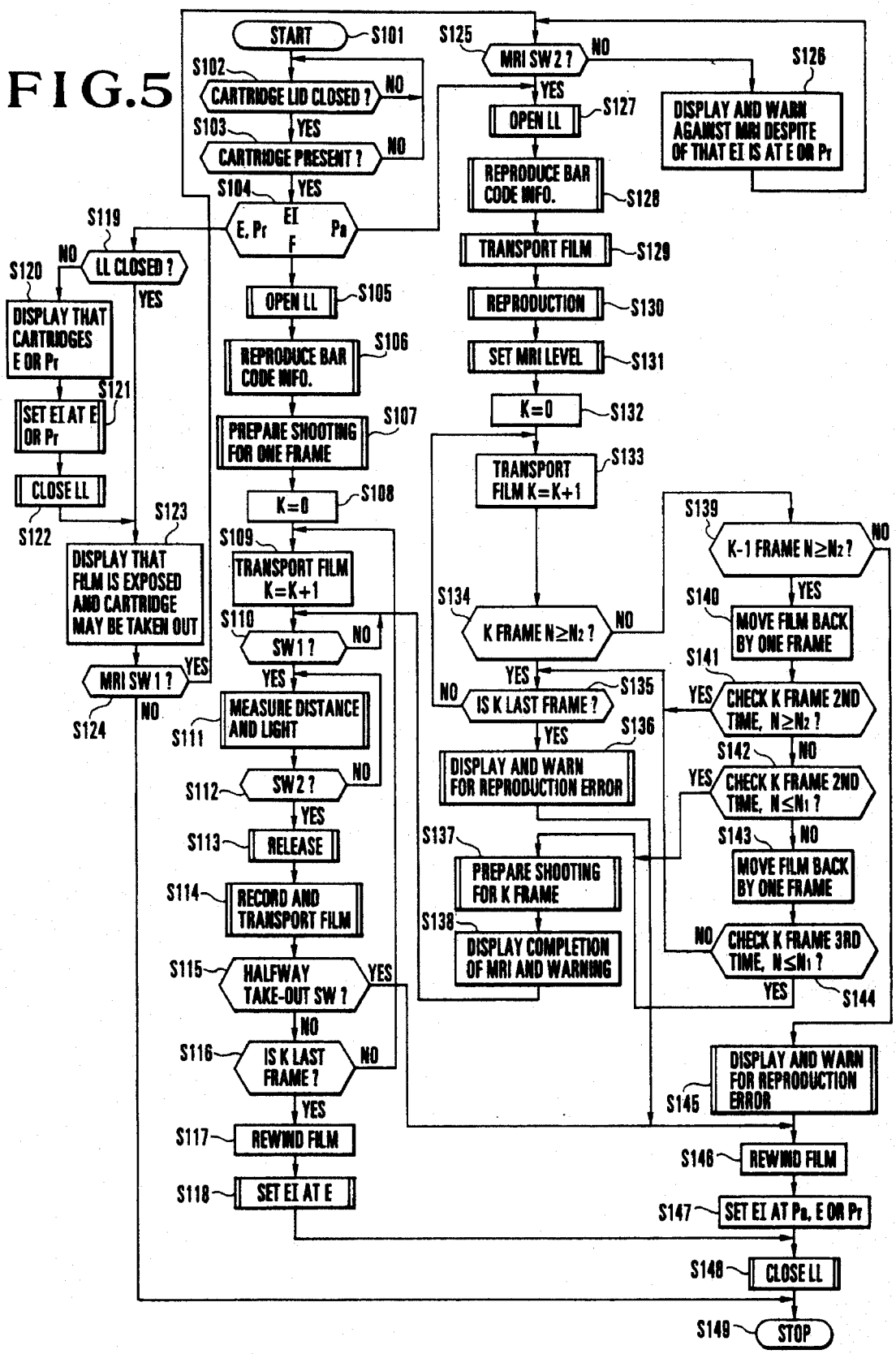
FIG. 5 is a flow chart showing the operation of the first embodiment of the invention.

FIG. 5 is a flow chart showing the operation of the control circuit 31 of the first embodiment. The operation is described with reference to the flow chart as follows.

At a step S101, the flow of operation begins. At a step S102, a check is made for the state of the cartridge-lid-closing detecting switch 42 to find if the lid of the cartridge 4 is closed. If so, the flow comes to a step S103. At the step S103, the cartridge presence and absence detecting switches 23 and 24 are checked to find if the cartridge 4 is present. If so, the flow comes to a step S104. If not, the flow comes back to the step S102.

At the step S104, the photoreflectors 12 and 13 are checked for the state of the film exposure indicator 6 of the film cartridge 4. The film exposure indicator 6 can take various states as shown in FIG. 3. In the event of the fully exposed state or the developed (processed) state, the flow comes to a step S119. If the film exposure indicator 6 is found to be in the not-exposed state, the flow comes to a step S105. In the case of the partially exposed state, the flow comes to a step S127.

In case where the whole film has not been exposed, the flow of operation is executed as follows.

At the step S105, the motor driver 35 is caused to drive the motor 21 to rotate the movable light-blocking window opening/closing member 15. By this, the movable light-blocking window operating part 5 of the cartridge 4 is rotated. The motor 21 is brought to a stop when the movable light-blocking window opening/closing detecting switches 17, 18 and 19 become conductive. The spool shaft 8 is rendered rotatable by the opening action of the movable light-blocking window 7. At a step S106, the motor driver 36 is caused to drive the motor 27 to rotate the rewinding connection member 25. The rotation of the rewinding connection member 25 causes the film exposure indicator 6 to rotate. Then, information on the number of exposable frames, ISO speed, the kind of the film, etc. recorded in a black-and-white pattern on the surface of the exposure indicator is reproduced. At a step S107, the film 1 is transported to a point before the first exposable frame portion of the film 1 according to signals outputted from the perforation sensors 1 and 2. At a step S108, the value of data K which represents a number of exposed frames is set at "0". At a step S109, the film 1 is fed further. The value of data K is incremented by one (K=K+1). The film 1 is brought to a stop according to the result of detection made by the perforation sensor 1.

At a step S110, a check is made to find if the switch 1 (37) is turned on with a (shutter) release button pushed. If so, the flow comes to a step S111 to cause the other control circuits 32 to perform automatic focusing and automatic exposure control actions. At a step S112, a check is made to find if the switch 2 (38) is turned on. If so, the flow comes to a step S113 to cause the other control circuits 32 to open and close the shutter. At a step S114, the magnetic recording/reproducing part 43 is caused to have photographing information including a date, a shutter speed, etc., recorded by the magnetic head 10. In other words, the motor driver 36 is caused to drive the motor 27 to transport (feed) the film 1, the recording frequency is decided by the perforation sensor 2 (29) and the information is recorded in the recording part of the film 1 while the film is on the move.

At a step S115, a check is made for the state of the halfway take-out (rewinding) switch 39. If the switch 39 indicates a halfway take-out state, the flow comes to a step S146. If not the flow comes to a step S116. At the step S116, a check is made to find if the value of the data K representing an exposed number of frames coincides with the number of exposable frames found by reproducing the bar code information at the step S106. If so, the step comes to a step S117 to have the film 1 rewound as all the frames have been exposed. If not, the flow comes back to the step S110. At the step S117, the motor driver 36 is caused to drive the motor 27 to reversely rotate. This causes the rewinding connection member 25 to rotate. The film 1 is thus rewound back into the cartridge 4. At a step S118, after the lapse of a predetermined period of time from a point of time at which the film 1 ceases to appear before the perforation sensor 2, the motor 27 is controlled according to the signals outputted from the photoreflectors 12 and 13 in such a way as to adjust the rotated position of the film exposure indicator 6 to an all-frame-exposed-state indicating position. The flow then comes to a step S148 to cause the motor driver to drive the motor 21 to rotate the movable light-blocking window opening/closing member 15. The movable light-blocking window 7 is closed. The flow of operation comes to an end at a step S149.

In case where the all frame portions of the film have been exposed or the film has already been subjected to a developing process, the flow of operation comes from the step S104 to a step S119 to executed the flow of operation as follows. At the step S119, a check is made to find if the movable light-blocking window is closed. If so, the flow comes to a step S123. If not, the flow comes to a step S120. If the movable light-blocking window is open, the spool shaft might have been rotated to change the position of the film exposure indicator 6. Besides, the open state of the window 7 might ruin the exposed part of the film 1 by exposing it to light. At the step S120, to inform the camera operator of this, the state of the film exposure indicator 6 is displayed by the display part 33. At a step S121, the state of the film exposure indicator 6 is adjusted to the original state by controlling the motor 27 in the same manner as at step S118. At a step S122, the movable light-blocking window 7 is closed in the same manner as at the step S148. At a step S123, since the movable light-blocking window 7 has been closed, the display part 33 is caused to make a display showing that all frames of the film have been exposed or that the film has been developed and another display showing that the film cartridge can be taken out.

At a step S124, a check is made for the state of the forcibly-halfway-taken-out film using (MRI) switch 1 (40). For example, if some film which has been only partially exposed has been handled by some other camera as having been completely exposed for all frames while it is actually only partially exposed and if that film is loaded on the camera of this embodiment, the number of usable frames still remaining unexposed on the film can be detected by turning on the forcibly-halfway-taken-out film using (MRI) switches 1 and 2 (40 and 41). If the forcibly-halfway-taken-out film using switch 1 (40) is found to be not conductive, the flow comes to a step S149. If the forcibly-halfway-taken-out film using switch 1 (40) is found to be conductive, the flow comes to a step S125 to make a check for the state of the forcibly-halfway-taken-out film using (MRI) switch 2 (41). This step is provided for use of the forcibly-halfway-taken-out film using switches 1 and 2 (40 and 41) as a double switch for making a display and for warning the camera operator of that each of frames of the film 1 is going to be checked for an exposed state while the film exposure indicator 6 indicates that all the frames of the film have been exposed. If the forcibly-halfway-taken-out film using switch 2 (41) is found to be not conductive, the flow comes to a step S126. At the step S126, a warning is given from the sound emitter 34 to inform the operator that each of the frames on the frame 1 is being checked for its exposed state despite of the state of the film exposure indicator 6 indicating that all the frames on the film 1 are either have been exposed or developed. Steps subsequent to this step are executed in the same manner as steps of flow of operation to be executed as described below for a partially exposed film.

The flow of operation for a partially exposed film is as follows. At a step S127, the movable light-blocking window is open in the same manner as at the step S105. At a step S128, information obtained on the film exposure indicator is reproduced in the same manner as at the step S106. At a step S129, the motor driver circuit 36 is caused to drive the film transporting motor 27 to transport the film 1 in the direction of moving it out from the cartridge 4. At a step S130, a pushing mechanism is caused to push the magnetic head 10 against the film 1 after the fore end of the film 1 passes the position of the magnetic head 10. The reproduction output of the magnetic head is amplified and converted into a digital signal by the magnetic recording/reproducing part 43.

However, since no magnetic information is recorded in the leader part of the film 1, the magnetic head 10 reproduces nothing else but a noise generated by the transporting motor 27. Therefore, the magnetic head 10 does not have to be pushed against the leader part of the film 1. At a step S131, the amount of information reproduced at the step S130 is assumed to be $N_0$ and, using predetermined values $\Delta N_1$ and $\Delta N_2$, a value $N_1$ below which a frame is to be regarded as not exposed is set as $$N_1 = N_0 + \Delta N_1$$

and a value above which a frame is to be regarded as exposed is set as follows:

$$N_2 = N_0 + \Delta N_2$$

The value $N_2$ is larger than the value $N_1$.

The predetermined values $\Delta N_1$ and $\Delta N_2$ may be arranged to be variable and selectable from a table arranged according to the value $N_0$. The amount of information mentioned above means an amount of a signal.

At a step S132, the value of the data K which represents a number of photographing frames is set at 0. At a step S133, the film transporting motor 27 is caused to transport one frame amount of the film 1 according to the signals of the perforation sensors 1 and 2 (29 and 30). The value of data K is incremented by one. An amount of information magnetically reproduced for a K-th frame (hereinafter referred to as K frame) while the film 1 is transported is assumed to be N. At a step S134, a check is made to find if the value N is equal to or larger than the value $N_2$. If so, the K frame are judged to be already exposed and the flow comes to a step S135. If the value N is found to be less than the value $N_2$, the K frame might be not exposed as yet and the flow comes to S139. At the step S135, the value of the data K is compared with the bar code information on the number of photographing frames reproduced by the step S128 to find if the value of the data K coincides with the last frame. If so, it indicates a state of having all the frames already exposed, which is contradictory to the decision made at the step S104 according to the film exposure indicator 6. The contradiction might has resulted from an increase caused by some external noise in the amount of the information reproduced. Therefore, at a step S136, the display part 33 is caused to display the possible reproduction error. The sound emitter is caused to sound a warning. Further, in case where the flow has come through the steps S124 and S125, all the frames have likely been exposed already and, therefore, a display is made to show that all the frames have been exposed.

At steps S146 and S147, the film 1 is rewound and stowed into the cartridge 4 in the same manner as at the step S117. However, the film exposure indicator 6 is set either in the partially exposed state or the fully exposed (all-frame-exposed) state as set by the step S104.

Next, in case where the K frame might not have been exposed as yet, the flow of operation is executed as follows. At the step S139, when the K frame is judged to be not exposed with the value N found to be less than the value $N_2$, a check is made for an amount of information obtained for a K-1 frame. If the value of the data K is 1, for example, the amount of information N obtained at K=0 is zero and then the flow comes to a S145 to make an error display. Since the first frame portion of the film 1 is found by the step S139 to be in an unexposed state which is contradictory to what has been decided by the step S104 according to the film exposure indicator 6, it is conceivable that some dust or the like might be sticking to the surface of the magnetic head 10. At the step S145, therefore, the display part 33 is caused to display this possibility and the sound emitter 34 to sound a warning. Further, with the value N found at the step S139 to be equal to or larger than the value $N_2$ for the K-1 frame, the amount of reproduced information increased by the dust or the like might be reduced if the K-1 frame is reproduced once more. Therefore, the flow comes to a step S140 to make a check for this possibility. At the step S140, the film 1 is moved back as much as one frame portion and the K frame is reproduced once again.

At a step S141, the amount N of reproduced information obtained from the K frame for the second time is compared with the value $N_2$. If the information amount N is found to be equal to or larger than the value $N_2$, the K frame is decided to be already exposed and the flow comes to a step S135. If the amount N is found to be less than the value $N_2$, the K frame might not have been exposed as yet and the flow comes to a step S142. At the step S142, the information amount N obtained by reproducing the K frame for the second time is compared with the value $N_1$. If the amount N is found to be equal to or less than the value $N_1$, the K frame is decided to be not exposed as yet and the flow comes to a step S137. At the step S137, the film 1 is fed to set the K frame at a photographable position. At a step S138, the display part 33 is caused to make a display showing that the halfway-taken-out cartridge has been completely set once again. The flow then comes to a step S110 and the preparation for photographing comes to an end.

If the information amount N obtained by reproducing the K frame for the second is found at the step S142 to be larger than the value $N_1$, the flow comes to a step S143. At the step S143, the film 1 is moved back as much as one frame portion and the information on the K frame is reproduced for a third time. At a step S144, the third reproduced information amount N for the K frame is compared with the value $N_1$. If the amount N is found to be larger than the value $N_1$, the K frame is judged to have been exposed and the flow comes to the step S135, because if the frame is judged to be unexposed in this instance, the frame might be caused to have a multiple exposure. If the amount N is found to be equal to or less than the value $N_1$, the frame is judged to be unexposed and the flow comes to the step S137.

Figure 6:
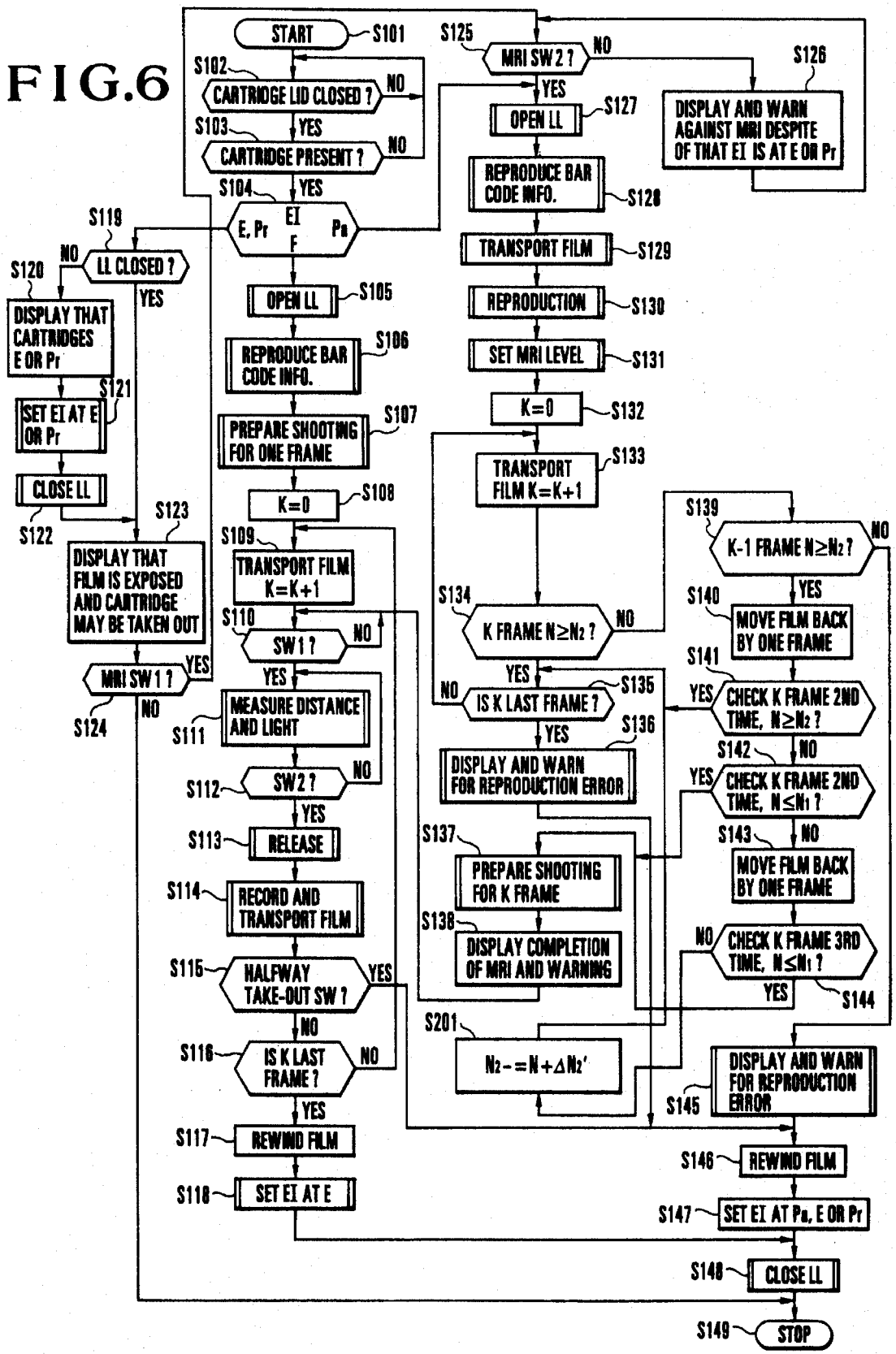
FIG. 6 is a flow chart showing the operation of a second embodiment of the invention.

FIG. 6 is a flow chart showing the operation of a second embodiment of the invention. The flow of operation corresponds to that of the first embodiment shown in FIG. 5. In FIG. 6, steps indicated by the same step numbers as those of FIG. 5 are provided for the same processes and actions and, therefore, they are omitted from the following description.

In the case of FIG. 6, a step S201 is added to the processes of FIG. 5. If the K frame is judged to have been exposed despite of that the information amount N of the K frame is less than the value N2, the flow comes to the step S201 to change the value $N_2$ as follow: $N_2 = N + \Delta N_2'$, wherein $\Delta N_2'$ represents a predetermined value. The value $\Delta N_2'$, however, may be set in comparison with the value $N_1$ at a suitable value larger than $N_1$.

The provision of the step S201 for setting the value $N_2$ at a smaller value in the above-stated manner, obviates the necessity of the steps S140 to S144 provided for reproducing the information once again.

Figure 7:
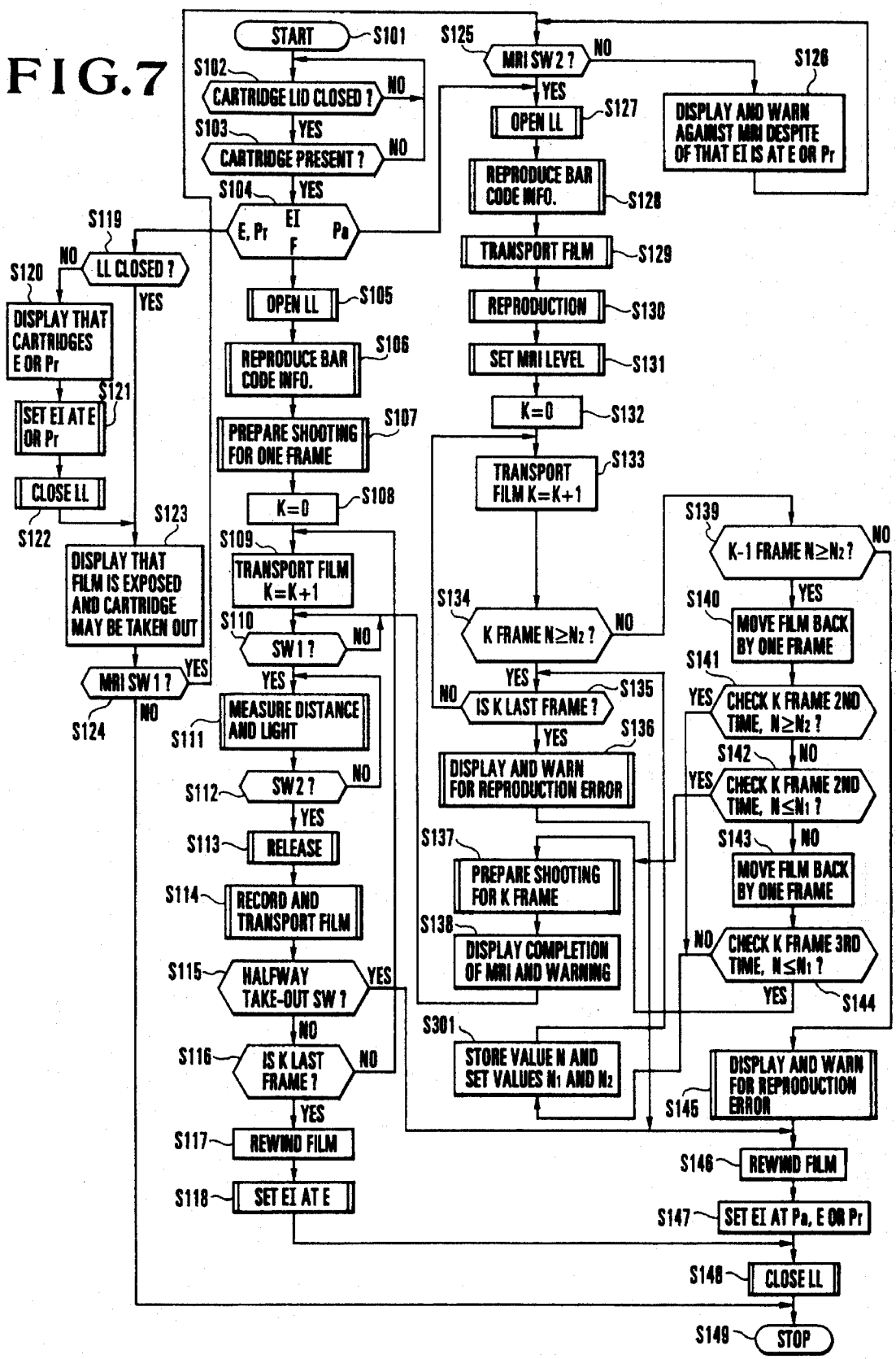
FIG. 7 is a flow chart showing the operation of a third embodiment of the invention.

FIG. 7 is a flow chart showing the operation of a third embodiment of the invention. The flow chart corresponds to the flow chart of the first embodiment shown in FIG. 5. In the case of FIG. 7, a step S301 is added to the processes of FIG. 5. At the step S301, information amounts N for first to K-th frames are stored. The values $N_1$ and $N_2$ are set, for example, according to an average value or the variance of these amounts N. This arrangement enables the third embodiment to accurately make a discrimination between an unexposed state and an exposed state.

Figure 8:
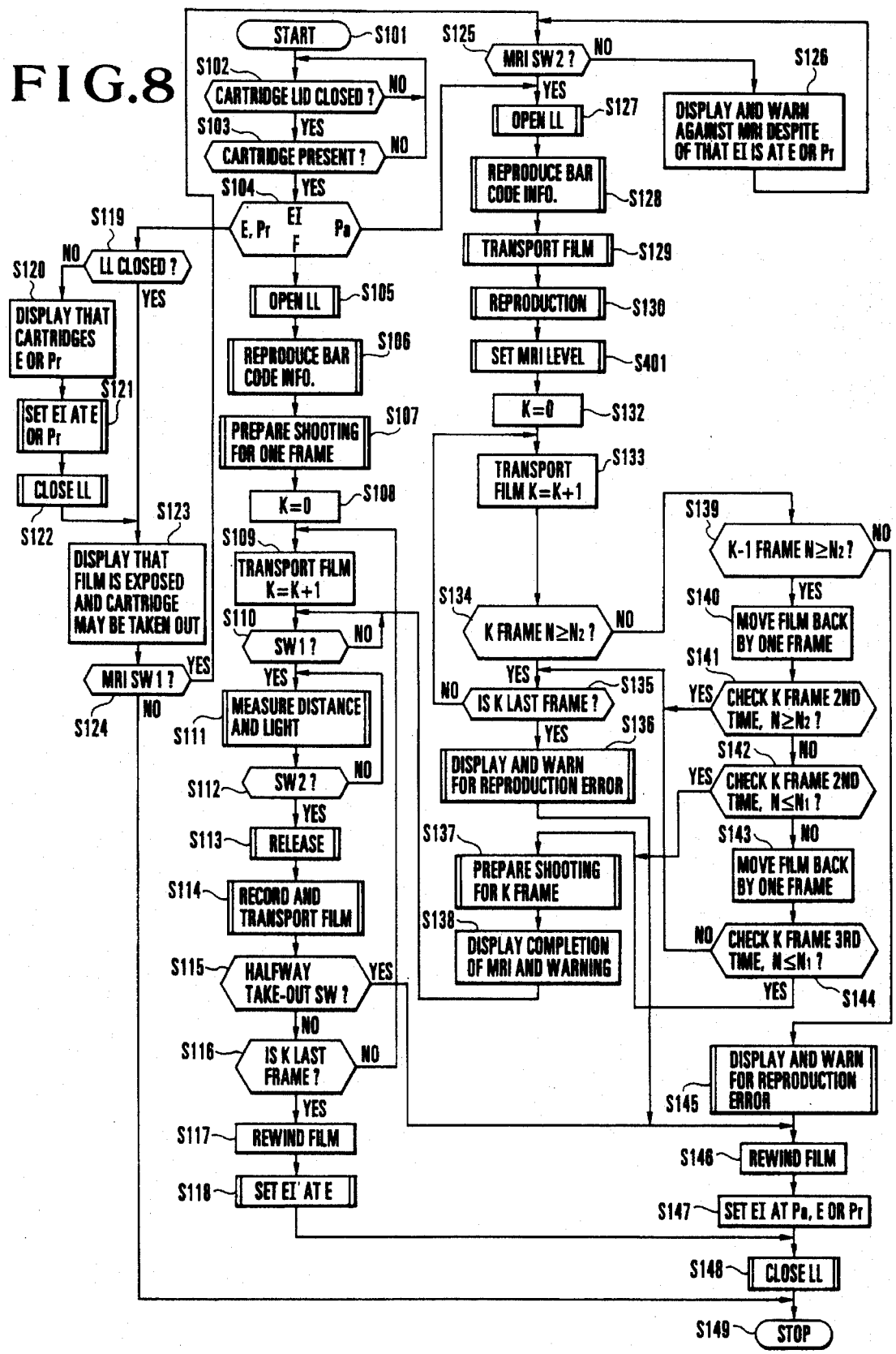
FIG. 8 is a flow chart showing the operation of a fourth embodiment of the invention.

FIG. 8 is a flow chart showing the operation of a fourth embodiment of the invention. The flow chart corresponds to the flow chart of the first embodiment shown in FIG. 5. In the case of FIG. 8, the step S131 is replaced with a step S401. The fourth embodiment applies to a case where the film is provided with a magnetic recording part which is disposed before the first frame, i.e. in the leader part of the film, in addition to the magnetic recording part provided at each of the frames. At the step S401, information recorded in this magnetic recording part provided in the leader part is reproduced. The values $N_1$ and $N_2$ are decided by reproducing the information. The step S401 enables the fourth embodiment to accurately and speedily make a discrimination between an unexposed state and an exposed state.

Figure 9:
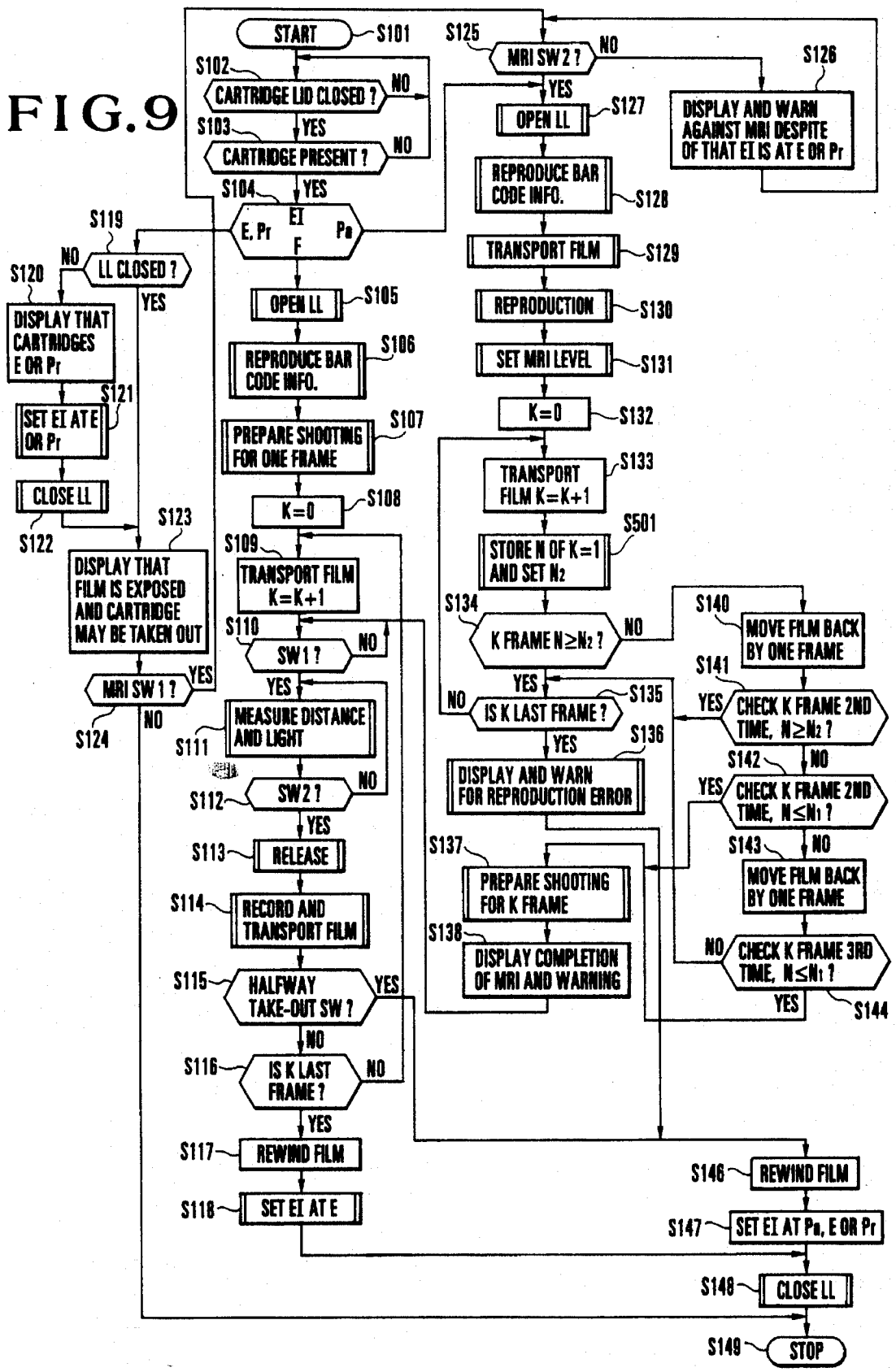
FIG. 9 is a flow chart showing the operation of a fifth embodiment of the invention.

FIG. 9 is a flow chart showing the operation of a fifth embodiment of the invention. The flow chart corresponds to the flow chart of the first embodiment shown in FIG. 5. In the case of FIG. 9, a step S501 is added to the processes of the first embodiment. At the step S501, the value $N_2$ is set according to an information amount N stored for the first frame (K=1). For example, the value $N_2$ is set as follows: $N_2 = N + N_2''$, wherein N represents an information amount for the first frame while $N_2''$ represents a predetermined value, which might be a negative value in some case.

The provision of the step S501 enables the fifth embodiment to accurately set the value $N_2$ and, therefore, to accurately and speedily make a discrimination between an unexposed state and an exposed state.

What is claimed is:

1. A camera adapted for using a film cartridge having an information recording part provided for each of frame portions of a film contained therein, comprising:
   a) reproducing means for reproducing information recorded in the information recording part for each individual frame portion of the film;
   b) deciding means for deciding whether each frame portion of the film has been exposed or not, on the basis of the amount of information reproduced from the frame portion by said reproducing means; and
   c) setting means for setting a reference value to be used by said deciding means, said setting means being arranged to set the reference value on the basis of an output of said reproducing means obtained when said reproducing means is acted on a part of the film other than the information recording part.

2. A camera according to claim 1, wherein the part other than the information recording part is a fore end part of the film.

3. A camera adapted for using a film cartridge having an information recording part provided for each of frame portions of a film contained therein, comprising:
   a) reproducing means for reproducing information recorded in the information recording part for each individual frame portion of the film;
   b) deciding means for deciding whether each frame portion of the film has been exposed or not, on the basis of the amount of information reproduced from the frame portion by said reproducing means; and
   c) setting means for setting a reference value to be used by said deciding means, said setting means being arranged to set the reference value on the basis of an information amount obtained from an information recording part first reproduced by said reproducing means.

4. A camera according to claim 3, wherein the film contained in the film cartridge is provided with an information recording part which is located in a part extending from a first frame portion on the side of a leader part toward the fore end of the film; and said setting means is arranged to set said deciding reference value on the basis of an amount of information reproduced by said reproducing means from the information recording part.

5. A camera according to claim 3, wherein said setting means is arranged to set the deciding reference value on the basis of an amount of information reproduced by said reproducing means from an information recording part provided for a first frame portion of the film.

6. A camera adapted for using a film cartridge having an information recording part provided for each of frame portions of a film contained therein, comprising:
   a) reproducing means for reproducing information recorded in the information recording part for each individual frame portion of the film;
   b) deciding means for deciding whether each frame portion of the film has been exposed or not, on the basis of the amount of information reproduced from the frame portion by said reproducing means; and
   c) setting means for setting a reference value to be used by said deciding means, said setting means being arranged to set the reference value on the basis of an amount of information obtained when the information recording part is reproduced by said reproducing means.

7. A camera according to claim 6, wherein said setting means is arranged to set the reference value on the basis of an amount of information reproduced by said reproducing means from each frame portion.

8. A camera adapted for using a film cartridge having an information recording part provided for each of frame portions of a film contained therein, comprising:
   a) reproducing means for reproducing information recorded in the information recording part for each individual frame portion of the film; and
   b) deciding means for deciding whether each frame portion of the film has been exposed or not on the basis of information reproduced by said reproducing means, said deciding means being arranged to decide the frame portion to have been exposed when the amount of the reproduced information is within a first range and to be unexposed when the amount of the reproduced information is within a second range, to cause the information of the information recording part to be reproduced again by said reproducing means when the amount of the reproduced information is within an intermediate range between the first and second ranges and, in that event, to again perform its deciding action on the basis of the information reproduced again.

9. A camera according to claim 8, wherein said deciding means is arranged to decide and judge the frame portion to have been exposed when the amount of the information reproduced again for the second deciding action of the deciding means is found to be not within the second range.

10. A camera adapted for using a film cartridge having an information recording part provided for each of frame portions of a film contained therein, comprising:
   a) reproducing means for reproducing information recorded in the information recording part for each individual frame portion of the film; and
   c) deciding means for deciding whether each frame portion of the film has been exposed or not, on the basis of the amount of information reproduced from the frame portion by said reproducing means, said deciding means being arranged to decide the frame portion to have been exposed when the amount of the reproduced information is larger than a first predetermined value and to be unexposed when the amount is smaller than a second value which is smaller than the first value, and to cause said reproducing means to reproduce the information of the same recording part once again when the amount of the reproduced information is between the first and second values.

11. A camera adapted for using a film cartridge having an information recording part provided for each of frame portions of a film contained therein, comprising:

a) reproducing means for reproducing information recorded in the information recording part for each individual frame portion of the film; and b) deciding means for deciding whether each frame portion of the film has been exposed or not, on the basis of the amount of information reproduced from the frame portion by said reproducing means, said deciding means being arranged to decide that the frame portion has been exposed when the amount of the reproduced information is within a first range and is unexposed when the amount is with a second range which is smaller than the first range, and to prohibit deciding that the frame portion has been exposed or is unexposed when the amount is in an intermediate range between the first and second ranges and then to decide that the frame portion has been exposed or unexposed on the basis of the amount of information again reproduced from the frame portion by said reproducing means.

* * * * *